United States Patent [19]
Pryor et al.

[11] 3,852,148
[45] Dec. 3, 1974

[54] ARCHITECTURAL PRODUCTS FORMED OF GLASS OR CERAMIC-TO-METAL COMPOSITES

[75] Inventors: Michael J. Pryor, Woodbridge; James M. Popplewell, Guilford, both of Conn.

[73] Assignee: Olin Corporation, New Haven, Va.

[22] Filed: May 18, 1972

[21] Appl. No.: 254,666

Related U.S. Application Data

[63] Continuation-in-part of Ser. Nos. 78,899, Oct. 7, 1970, Pat. No. 3,676,292, and Ser. No. 231,834, March 6, 1972.

[52] U.S. Cl.............. 161/41, 52/235, 52/303, 117/129, 161/196, 161/160, 161/213, 161/225
[51] Int. Cl............... B32b 15/04, B32b 15/20
[58] Field of Search............ 161/41, 113, 116, 117, 161/196, 213; 29/195, 472.3; 117/129; 75/143, 146, 162, 141; 156/3; 52/235

[56] References Cited
UNITED STATES PATENTS

| | | | |
|---|---|---|---|
| 2,918,595 | 12/1959 | Cressman | 75/162 |
| 3,220,815 | 11/1965 | McMillan et al. | 161/196 |
| 3,259,491 | 7/1966 | Pryor | 75/162 |
| 3,360,349 | 12/1967 | Adomines | 29/195 G |
| 3,381,364 | 5/1968 | Winter | 29/472.3 |
| 3,402,043 | 9/1968 | Smith | 75/162 |
| 3,676,292 | 7/1972 | Pryor et al. | 161/196 |
| 3,677,828 | 7/1972 | Caule | 156/3 |
| 3,694,273 | 9/1972 | Crane et al. | 75/162 |

OTHER PUBLICATIONS

R. H. Dalton, Glass to Metal Joints, Product Engineering, Apr. 26, 1965, p. 62–71.
Belser, New Methods for Decorative Application of Metal to Glass and Ceramic Surfaces, October 1953, p. 17–30, Ceramic Age.

*Primary Examiner*—George F. Lesmes
*Assistant Examiner*—Paul J. Thibodeau
*Attorney, Agent, or Firm*—David A. Jackson; Robert H. Bachman

[57] ABSTRACT

Architectural products comprising a glass or ceramic-to-metal composite sheet which comprises at least one glass or ceramic component bonded to a copper base alloy component containing from about 2 to about 12% aluminum. The composite sheet may be employed as a panel supported or unsupported by a backing member. The composite sheet may also be employed in building curtain wall.

7 Claims, 8 Drawing Figures

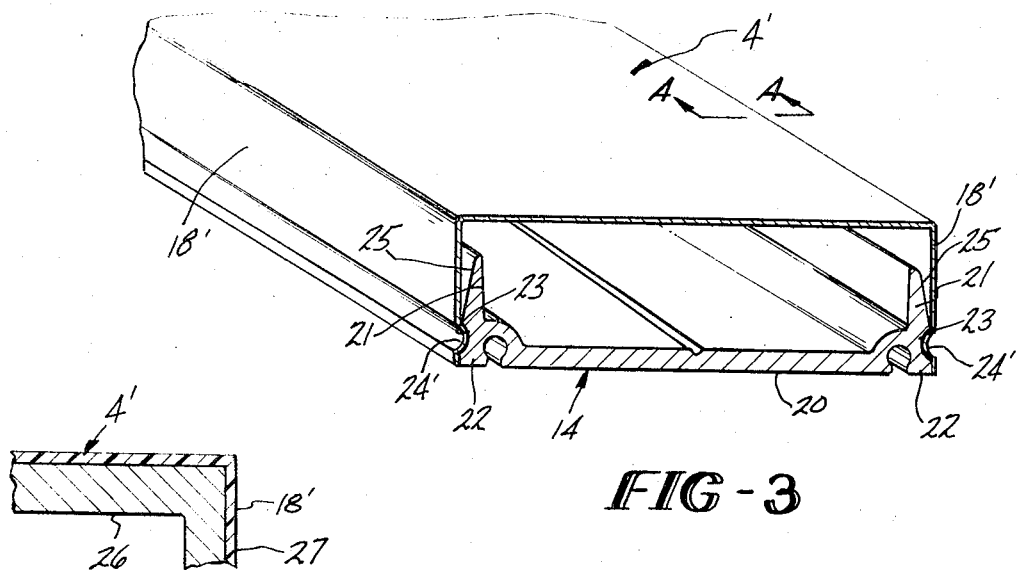
FIG-3
FIG-4
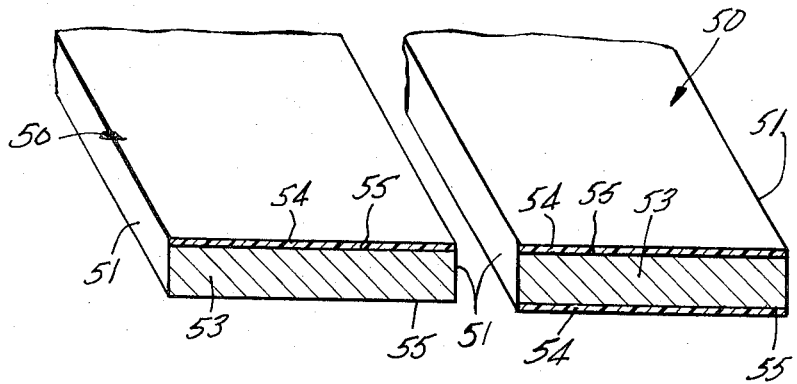
FIG-5A  FIG-5B
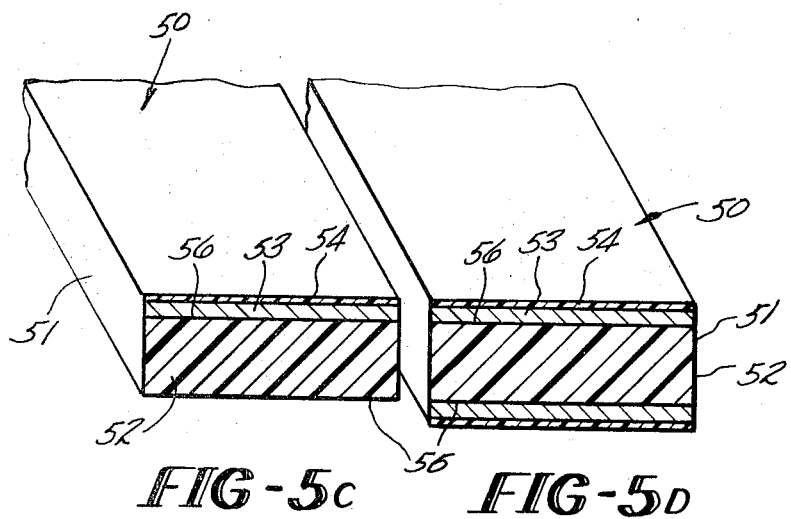
FIG-5C  FIG-5D

3,852,148

ARCHITECTURAL PRODUCTS FORMED OF GLASS OR CERAMIC-TO-METAL COMPOSITES

CROSS REFERENCE TO RELATED APPLICATIONS

This application is a continuation-in-part of copending applications Ser. No. 78,899, filed Oct. 7, 1970 now U.S. Pat. No. 3,676,292, and Ser. No. 231,834, filed Mar. 6, 1972.

BACKGROUND OF THE INVENTION

In the architectural field, it is known to employ copper alloys in applications such as building curtain wall. In accordance with this invention, it has been found that a novel glass or ceramic-to-metal composite wherein the metal is a copper base alloy having at least about 2 to 12% aluminum is uniquely adaptable to architectural uses such as building curtain wall, internal wall constructions, partitions and other types of panels and architectural facings where a decorative and pleasing appearance is desired.

It is well known that copper base alloys rapidly tarnish in most atmospheres to produce oxides and compounds of copper which detract from the aesthetic appearance thereof and therefore require mechanical or chemical cleaning to restore their pleasing appearance. Various coatings of paints or lacquers have been applied to the surfaces of these alloys in order to provide tarnish and oxidation resistance; however, these paints and lacquers generally are not very durable. This lack of durability often results in exposing various areas of the underlying metal surface which in turn leads to selective corrosion attack of the metal at the exposed areas.

In U.S. Pat. No. 3,676,292, there is disclosed a glass or ceramic-to-metal composite comprising a glass or ceramic component bonded to a copper base alloy component comprising 2 to 12% aluminum and the balance essentially copper. In accordance with this invention the glass or ceramic component provides a very durable and corrosion resistant surface and, therefore, this composite is uniquely suited for use in architectural applications, such as those enumerated above.

SUMMARY OF THE INVENTION

In accordance with this invention, the glass or ceramic-to-metal composite disclosed in U.S. Pat. No. 3,676,292, is employed as a facing for architectural applications, such as building curtain wall, internal wall constructions, partitions, and other types of panels and architectural facings. For some applications, the composite may be used without any backing; however, for other applications, the composite may be affixed to a suitable backing member to provide additional support.

The backing member may comprise any conventional type of backing material such as, for example, metal, plastic, wood, polymeric foam, such as a rigid polyurethane foam, gypsum wall board, plywood, particle board, hard board or other suitable materials useful for this purpose. The composite can be affixed to the backing member by any conventional means such as the use of glue or other types of adhesives.

This invention is particularly applicable to building curtain wall such as disclosed in U.S. Pat. Nos. 3,466,826, granted Sept. 6, 1969; 3,488,906, granted Jan. 13, 1971; and 3,553,918, granted Jan. 12, 1971.

All of these curtain walls have in common the use of a plurality of horizontal and vertical structural members forming a framework for receipt of glazing or decorative panels and a plurality of retaining members for securing the glazing or panels to the framework and a plurality of channel shaped snap on cover or facing members supported by the retaining members for providing an aesthetically pleasing appearance.

In addition the curtain walls of the aforenoted patents include a thermal break feature which insulates the inside framework from the retaining members and cover members on the outside of the building. While this is a highly desirable feature of a building curtain wall, it does not comprise an essential aspect of the instant invention.

This invention is particularly directed with respect to building curtain wall to the use of the aforenoted glass or ceramic-to-metal composite as cover or facing members and as decorative panels either unsupported or supported by a backing member.

The glass or ceramic-to-metal composite in accordance with this invention is unique in that it has been found that the copper base alloy component within certain ranges of composition forms on its surface an oxide layer, one compound of which is $Al_2O_3$ in the form of a compact continuous film. The $Al_2O_3$ film forms immediately adjacent to the metal surface and is strongly adherent to it. The $Al_2O_3$ film comprises at least 10% of the total oxide film thickness. When the glass or ceramic component is bonded to the copper base alloy component having the $Al_2O_3$ film, a strong bond results.

This high bond strength between the copper base alloy component and the glass or ceramic component allows composites to be fabricated which can tolerate a high degree of mismatch of coefficient of expansion between the glass or ceramic component and the copper base alloy component. Further, where this degree of mismatch can be minimized, a glass or ceramic-to-metal composite is formed having unusually good adherence of the glass or ceramic to the metal due to the high bond strength between the components of the composite.

Therefore, in accordance with this invention, a coated copper base alloy architectural facing is provided having improved durability and corrosion resistance.

It is a further object of this invention to provide a building curtain wall having cover members and/or decorative panels employing a glass or ceramic-to-metal composite wherein the metal is a copper base alloy which forms an $Al_2O_3$ film on its surface.

It is a further object of this invention to provide panels which can be used in building curtain wall as well as internal wall constructions, partitions, and the like, wherein the panels comprise a glass or ceramic-to-metal composite wherein the metal is a copper base alloy which forms a thin film of $Al_2O_3$ on its surface, the composite being either unsupported or supported by a backing member.

Other objects and advantages will become apparent to those skilled in the art as a detailed description proceeds with reference to the drawings.

BRIEF DESCRIPTION OF THE DRAWINGS

FIG. 3 is a perspective view showing a cover member in accordance with this invention affixed to a typical prior art retaining member.

FIG. 4 is a cross section along the line A—A of FIG. 3 of a corner portion of the cover member of FIG. 3.

FIG. 5 shows in perspective cross sections of portions of typical panels in accordance with this invention.

DESCRIPTION OF THE PREFERRED EMBODIMENTS

Figure 1:
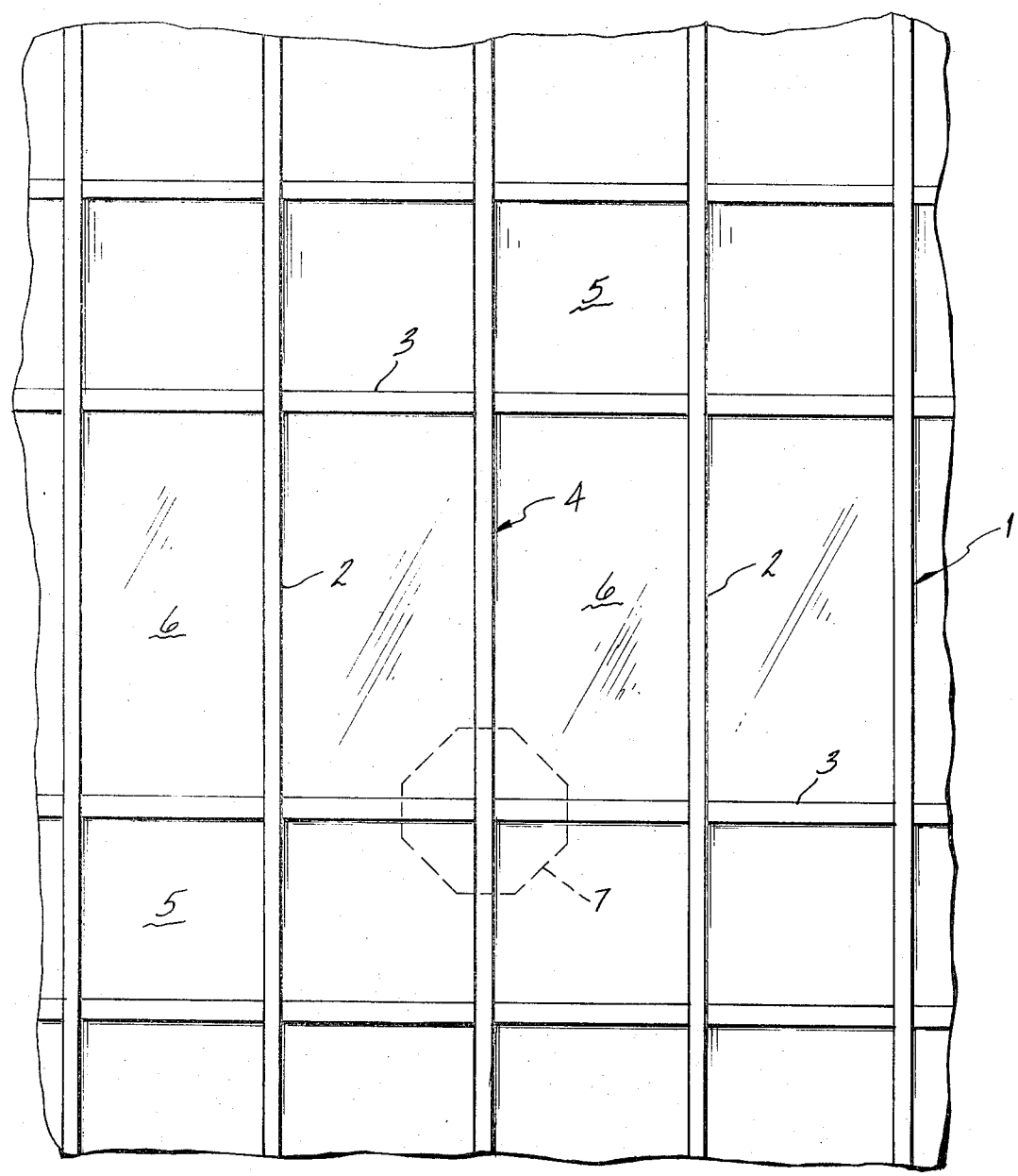
FIG. 1 is a partial front view of a typical prior art building curtain wall.

This invention is directed to an architectural facing formed from a glass or ceramic-to-metal composite wherein the metal is a copper base alloy having from about 2 to 12% aluminum and the balance essentially copper. The composite facing of this invention provides an aesthetically pleasing appearance and improved durability and resistance to corrosion and is, therefore, uniquely adapted for use in such applications as building curtain wall, internal wall constructions, partitions and other types of panels.

Suitable copper base alloys for use in the glass or ceramic-to-metal composite facing of this invention preferably contain from about 2% to about 10% aluminum, from about 0.001 to about 3% silicon and a grain refining element selected from the group consisting of iron up to about 4.5%, chromium up to about 1%, zirconium up to about 0.5%, cobalt up to about 1% and mixtures of these grain refining elements. The alloy may also include up to 35% zinc.

In particular, CDA Alloy 638 containing 2.5 to 3.1% aluminum, 1.5 to 2.1% silicon and 0.25 to 0.55% cobalt is most useful.

Impurities may be present in amounts not adversely affecting the properties of the glass or ceramic-to-metal composite facing of this invention. In particular, the impurities may include less than 1% nickel, less than 1% manganese, less than 1% tin, less than 0.5% lead, less than 0.1% phosphorus and less than 0.1% arsenic.

The aforenoted limitations of impurity elements apply to those elements only when they are present as impurities and not if they are used as alloying elements.

The aforenoted copper base alloys form on their exposed surfaces an oxide, one component of which is $Al_2O_3$ in the form of a thin compact continuous film. The $Al_2O_3$ film forms immediately adjacent to the metal, is strongly adherent to it and comprises at least about 10% and up to about 100% of the total thickness of the oxide.

Alumina seals efficiently to most glasses and ceramics. Therefore, since the alumina film formed on the alloys used with this invention is tightly adherent to the alloys, an excellent glass or ceramic-to-metal bond is produced.

The alumina film on the alloys in accordance with this invention may be formed by any conventional techniques as are known in the art. It may be formed during the coating of the alloy component with the glass or ceramic component or the alloy component may be preoxidized by conventional techniques such as heating the alloy component to a temperature in the range of 200° to 700°C for a period of time of at least 2 seconds. Normally, however, the alumina film is formed on the surface of the alloy component during the coating of the metal with the glass or ceramic.

Any well known glass or ceramic which will readily fuse with the alumina film on the metal surface may be used as the glass or ceramic in the composite facing of this invention. However, the mismatch in coefficient of thermal expansion between the metal component and the glass component should be less than $110 \times 10^{-7}$ in./in./°C, and preferably, less than $75 \times 10^{-7}$ in./in./°C and, more preferably, less than $60 \times 10^{-7}$ in./in./°C.

It is one of the unique aspects of the glass or ceramic-to-metal composite facing of this invention that it is able to tolerate a substantial mismatch in coefficient of expansion between the glass or ceramic and the metal component. If stronger and/or more elastic glasses are developed even greater degrees of mismatch than above noted could be tolerated.

TABLE I lists various exemplary glasses and ceramics which are adapted for use in accordance with this invention.

TABLE I

| GLASS OR CERAMIC TYPE | COEFFICIENT OF THERMAL EXPANSION in./in./°C |
| --- | --- |
| MOST PREFERRED | |
| * CORNING - Code No. 7047 (Barium Silicate Glass) | $140 \times 10^{-7}$ |
| * FERRO CORPORATION No. EN-701-A (Clear Porcelain) | approximately $160 \times 10^{-7}$ |
| PREFERRED | |
| * OWENS - Illinois No. 00583 (Sealing Glass) | $117 \times 10^{-7}$ |
| ** BOROSILICATE CLEAR PORCELAIN 50% $SiO_2$, 20% $B_2O_3$, 12.5% Cryolite, 10% BaO, 2.5% ZnO, 2.5% $K_2O$, 2.5% $Na_2O$ | approximately $72 \times 10^{-7}$ |
| LEAST PREFERRED | |
| * G.E. - ReX (Sealing Glass) | $90 \times 10^{-7}$ |
| ** SODA - LIME - SILICA GLASS 70% $SiO_2$, 11% CaO, 14% $Na_2O$, + $Al_2O_3$ + MgO | $90 \times 10^{-7}$ |
| ** PORCELAIN 40% Leucite ($K_2O$, $Al_2O_3$, $4SiO_4$) 30% Mullite ($3Al_2O_3$, $2SiO_2$) 30% $SiO_2$ | $60 \times 10^{-7}$ |

TABLE I — Continued

| GLASS OR CERAMIC TYPE | COEFFICIENT OF THERMAL EXPANSION in./in./°C |
|---|---|
| ** SEALING GLASS TYPE 101 ASTM No. F-79-67T 56% $SiO_2$, 1.5% $Al_2O_3$, 4.0% $K_2O$, 29.0% PbO | $92 \times 10^{-7}$ |

\* Proprietary Composition
\*\* Values in Weight Percent

The proprietary glass Code No. 7047 manufactured by the Corning Glass Company, Corning, N.Y. has a coefficient of thermal expansion which is close to that of Alloy 638 and, therefore, in accordance with the most preferred embodiment of this invention, it is desirable to employ this particular type of glass.

It has also been found that additions of 2 parts boric acid, 1.35 parts KOH, 9.3 parts potassium silicate, 0.5 parts silicic acid per 100 parts of the clear porcelain No. EN-701-A manufactured by the Ferro Corporation, Cleveland, Ohio is beneficial in accordance with this invention.

It has been found that various glasses and ceramics can be employed in this invention and the examples set forth in Table I are not meant to be limitive of the invention.

Preferably, the glass or ceramic component should be clear and transparent so that the full aesthetic appearance of the underlying copper base alloy component shows through; however, the invention is not limited thereto. For example, additions of various compounds to glasses or ceramics are known to cause them to be tinted or colored and, therefore, it is possible to change the color exhibited by the facing of this invention by the addition of such compounds to the glass or ceramic component.

These compounds may include but are not limited to $MnO_2$, $Fe_2O_3$, $Cu_2O$, $Co_2O_3$, NiO, $K_2Cr_2O_7$, $Na_2UO_4$, and combinations of these compounds in amounts from 0.1% to about 10% by weight. The use of such additions provides colored facings which vary in color depending on the glass or ceramic which is employed and the particular compounds added thereto. It is possible to obtain bronzes, greens, lavenders, blues, etc., and in particular, the addition of $MnO_2$ to the Borosilicate Clear Porcelain of Table I yielded a purple tint.

Further, translucent or opaque coatings having various colors could also be employed as the glass or ceramic component in accordance with this invention.

Figure 2:
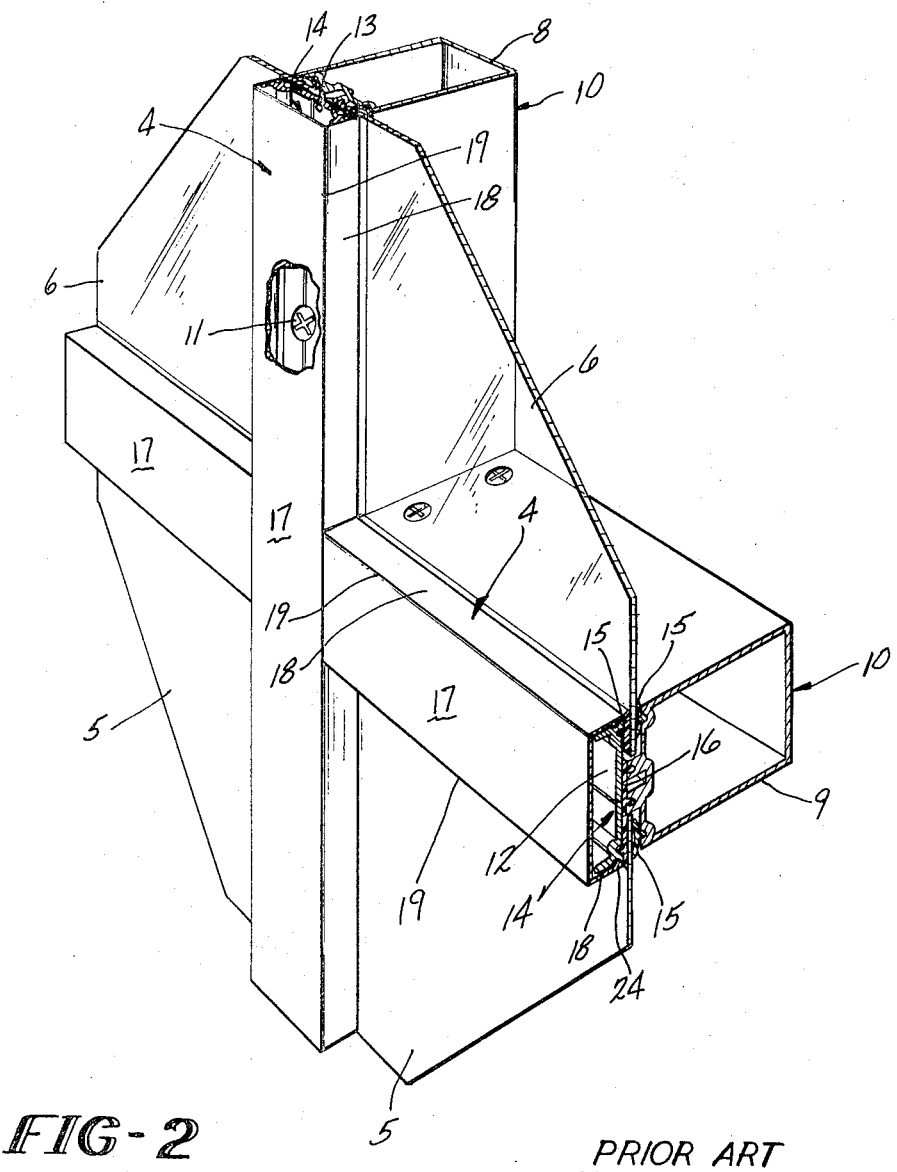
FIG. 2 is a perspective view of an octagonal section of the curtain wall of FIG. 1.

Referring to FIGS. 1 and 2, there is shown an exemplary curtain wall 1 structure as typical of the prior art. Only a portion of the curtain wall 1 is shown. The curtain wall 1 shown in FIG. 1 is typical of designs commonly found in many of todays modern high rise buildings. It comprises a plurality of vertical 2 and horizontal 3 facing members 4 which are part of a framework for holding in place a plurality of decorative panels 5 and windows 6.

An octagonal section 7 of the curtain wall 1 of FIG. 1 is shown in perspective in FIG. 2. The curtain wall 1 design shown in FIG. 2 corresponds substantially to the Lupton Series 2500 wall manufactured by the Lupton Manufacturing Company, Philadelphia, Pa.

This particular curtain wall is described merely by way of example and is not meant to be limitive of the invention. As aforenoted, the curtain wall systems of U.S. Pat. Nos. 3,466,826, 3,488,906 and 3,553,918 are also adaptable for use in accordance with the instant invention as well as a wide variety of other known curtain wall systems which employ facing members 4 and/or decorative panels 5.

FIG. 2 shows the vertical 8 and horizontal 9 structural members 10 which are secured to the building. Secured to each of the structural members 10 by means of screws 11 are a plurality of corresponding horizontally 12 and vertically 13 disposed retaining members 14.

The gaps between the retaining members 14 and the structural members 10 are adapted to receive in sealing engagement the decorative panels 5 or windows 6. The sealing engagement is provided by resilient gaskets 15 which are secured to the structural members 10 and retaining members 14 and which engage the panels 5 or windows 6. In the curtain wall 1 shown, a resilient gasket 16 is also interposed between the structural members 10 and the retaining members 14 to provide a thermal break, except at the points where the screws 11 secure the retaining members 14 to the structural members 10.

Since the retaining members 14 do not present a pleasing appearance from the architectural point of view, snap on facing members 4 are employed. These facing members 4 provide a pleasing architectural appearance by eliminating from sight the joining screws 11. The facing members 4 are generally of channel configuration comprising a web section 17 and side walls 18 projecting outwardly in the same direction from the longitudinal edges 19 of the web section 17.

The retaining members 14 are also of a channel configuration as best shown in FIG. 3 comprising a web section 20 and side walls 21 projecting outwardly in the same direction and extending from the longitudinal edges 22 of the web section 20. Each side wall 21 includes an outside groove 23 adapted to receive a corresponding rib 24 from the snap on facing member 4 and an inclined outer portion 25 for making it easier to snap the facing member 4 onto the retaining member 14 by providing a wedge type action to spread apart the side walls 21 of the facing member 4 until it is snapped in place with the ribs 24 of the facing member seated in the grooves 23 of the retaining member 14.

FIG. 3 shows a typical facing member 4' in accordance with this invention in place after it has been snapped onto a conventional retaining member 14. The facing member 4' has a similar channel configuration to that of the facing member 4 of the prior art except that the ribs 24 which are adapted to seat in the grooves 23 of the retaining member 14 comprise grooves 24' in the side walls 18' of the facing member 4'.

The grooves 24' formed in the side walls 18' of the facing member 4' of this invention may have any desired shape which is adapted to seat in the grooves 23 of the retaining member 14. The grooves shown in FIG. 3 have a semi-circular shape; however, any desired shape could be employed.

The cross section taken along the line A—A of FIG. 3 and shown in FIG. 4 clearly shows the composite of this invention having the copper base alloy component 26 and the glass or ceramic component 27 bonded thereto. While copper base alloys are by their nature more expensive than aluminum, there is a considerable savings in materials involved in accordance with this invention because thin sheet may be used for the facing member 4' thereby using less metal. For example, it has been found that the facing members 4' formed from composite sheet wherein the metal is from 0.01 inch to 0.06 inch thick have sufficient strength to replace the conventional extruded aluminum facing members 4 which are considerably thicker.

In accordance with this invention, the aforenoted glass or ceramic-to-metal composite facing is also useful as panels for architectural and decorative purposes. The panels 50 comprise a sheet like structure, portions of which are shown in FIG. 5. The peripheral edge 51 of the panel 50 may have any desired shape as, for example, it may be rectangular, square, circular, etc., or any other conventional shape employed for architectural or decorative purposes. FIG. 5 shows sections in perspective of rectangular type panels 50.

The composite facing may be used as a panel 50 either supported or unsupported by a backing member 52. An unsupported panel 50 as shown in FIG. 5A would comprise merely a sheet of the glass or ceramic-to-metal composite having the desired peripheral edge 51 shape. An unsupported panel 50 would generally require the use of a thicker metal component 53 in the composite to provide sufficient resistance to flexure which might cause damage to the glass or ceramic component 54 such as cracking.

The panel 51 may have a glass or ceramic component 54 on one major face 55 as in FIG. 5A or on both major faces 55 as in FIG. 5B the latter configuration being most useful in wall constructions, partitions and the like where both sides of the panel are visible.

It is economically advantageous, however, to employ a metal component 53 which is as thin as possible since this is the most expensive part of the composite facing of this invention. However, a thin metal component 53 generally should be backed by a suitable backing member 52 as in FIGS. 5C and 5D to provide sufficient support to prevent flexure which might damage the composite facing.

The backing member 52 may be formed of any conventional material known to be used for such purposes. For example, it may be metal, plastic, wood, gypsum type wall board, plywood, hardboard, particle board and like kinds of building materials. Preferably, the backing member 52 is a polymeric foam particularly a polyurethane foam and, most preferably, a rigid polyurethane foam. The use of a polymeric foam provides substantial advantages because of its thermally insulating and sound deadening nature.

The composite facing may be affixed to the backing member 52 by any conventional means. For example, it may be affixed by means of laminating, by means of adhesives, by cladding where the backing member is a metal or by any other desirable method.

The panel 50 shown in FIG. 5C has the composite facing of this invention on only one side 56 of the backing member 52. This configuration is particularly adapted for use in building curtain wall wherein only one face of the panel 50 is visible. Therefore, a panel 50 constructed as in FIG. 5C could be employed in the curtain wall of FIGS. 1 and 2 in place of the panels 5 shown therein. For applications where both sides of the panel 50 are visible a panel constructed as shown in FIG. 5D could be employed. The only difference between the panel of FIG. 5D and the panel of FIG. 5C is that the composite facing of this invention is employed on both sides 56 of the backing member 52.

The thickness of the backing member 52 may be set as desired in accordance with the intended application. The thickness of the metal component 53 of the composite facing should be maintained as thin as possible to conserve metal usage and reduce costs. It has been found in practice that the metal component 53 of the composite facing for a supported panel 50 may practically range in thickness from about 0.001 to 0.060.

The glass or ceramic-to-metal composite facing of this invention is generally formed by applying the glass or ceramic, for example, in the form of a fine powder or frit to the surface of the metal component 26 or 53 in any conventional manner and then firing the composite to melt and fuse the glass or ceramic and bond it to the metal component 26 or 53 by means of the alumina film on the metal surface. Normally, all deformation or forming of the metal component 26 or 53 is performed prior to the application of the glass or ceramic component 27 or 54.

In practice, the most preferred means for applying the glass or ceramic component 27 or 54 is to spray a slurry of the glass or ceramic powder or frit in a suitable carrier, such as water, onto the surface of the metal component 26 or 53 and then fire the glass or ceramic. The particular firing temperature employed is dependent on the glass or ceramic which is used and does not form a part of the instant invention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A panel comprising:
   a backing member having a side and an opposing side; and
   a composite facing comprising;
   a. a metal sheet having a major face and an opposing major face, and being prepared from a copper base alloy comprising from about 2 to about 12% aluminum, .001 to 3% silicon, up to 35% zinc and a grain refining element selected from the group consisting of iron up to 4.5%, chromium up to 1%, zirconium up to 0.5%, cobalt up to 1% and mixtures thereof, balance essentially copper, and
   b. a coating selected from the group consisting of glasses and ceramics which is involved in a bond selected from the group consisting of glass-to-metal bonds and ceramic-to-metal bonds, and is formed over at least one of said major face and said opposing major face of said sheet,
   said composite facing being affixed to at least one side of said backing member whereby the uncoated major face, if any, of said sheet is in contact with the side or sides of said backing member.

2. A panel as in claim 1 wherein said composite facing is affixed to both said side and said opposing side of said backing member.

3. A panel as in claim 1 wherein said coating is bonded to both said major face and said opposing major face of said sheet.

4. A panel as in claim 1 wherein said copper base alloy consists essentially of 2.5 to 3.1% aluminum, 1.5 to 2.1% silicon, 0.25 to 0.55% cobalt, the balance essentially copper.

5. A panel as in claim 4 wherein said coating is bonded to both said major face and said opposing major face of said sheet.

6. A panel as in claim 4 which comprises a partition.

7. A panel as in claim 5 which comprises a partition.

* * * * *